(12) United States Patent
Ishikawa

(10) Patent No.: US 8,780,455 B2
(45) Date of Patent: Jul. 15, 2014

(54) LENS DRIVING APPARATUS, OPTICAL APPARATUS AND CONTROL METHOD FOR LENS DRIVING APPARATUS

(75) Inventor: Daisuke Ishikawa, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 12/643,877

(22) Filed: Dec. 21, 2009

(65) Prior Publication Data
US 2010/0165479 A1   Jul. 1, 2010

(30) Foreign Application Priority Data

Dec. 26, 2008  (JP) ................................ 2008-332272

(51) Int. Cl.
*G02B 15/14* (2006.01)
(52) U.S. Cl.
USPC .......................................... 359/698; 359/684
(58) Field of Classification Search
CPC .................................... G02B 7/04; G02B 7/09
USPC .................... 359/676, 683, 684, 698; 396/134
See application file for complete search history.

(56) References Cited

U.S. PATENT DOCUMENTS

| | | | |
|---|---|---|---|
| 5,391,866 A | | 2/1995 | Hoshino et al. |
| 6,085,044 A | * | 7/2000 | Kawanami ..................... 396/134 |
| 2007/0212048 A1 | * | 9/2007 | Morimoto ....................... 396/85 |
| 2009/0168199 A1 | * | 7/2009 | Ishikawa et al. ............... 359/696 |

FOREIGN PATENT DOCUMENTS

| | | |
|---|---|---|
| JP | 05-281449 | 10/1993 |
| JP | 07-248446 A | 9/1995 |
| JP | 11-110045 | 4/1999 |
| JP | 2001-004896 A | 1/2001 |

OTHER PUBLICATIONS

The above references were cited in a Nov. 13, 2012 Japanese Office Action, which is enclosed without an English Translation, that issued in Japanese Patent Application No. 2008-332272.

* cited by examiner

*Primary Examiner* — Alicia M Harrington
(74) *Attorney, Agent, or Firm* — Cowan, Liebowitz & Latman, P.C.

(57) ABSTRACT

The lens driving apparatus moves a magnification-varying lens and moves a focus lens to compensate for image plane variation caused by movement of the magnification-varying lens. The apparatus includes a zoom operating member, a stepping motor, a zoom controller controlling drive of the stepping motor, a focus actuator moving the focus lens, a focus controller controlling drive of the focus actuator, a memory storing cam data to compensate for the image plane variation, and a zoom position detector. During a magnification variation operation, the zoom controller performs open-loop control of the drive of the stepping motor based on an operation amount of the zoom operating member, and the focus controller controls the drive of the focus actuator based on the actual position of the magnification-varying lens detected by the zoom position detector, and the cam data.

7 Claims, 4 Drawing Sheets

LENS DRIVING APPARATUS, OPTICAL APPARATUS AND CONTROL METHOD FOR LENS DRIVING APPARATUS

BACKGROUND OF THE INVENTION

The present invention relates to a lens driving apparatus used in an optical apparatus such as a video camera. The lens driving apparatus moves a magnification-varying lens and moves a focus lens in order to compensate for image plane variation caused by movement of the magnification-varying lens.

Lens driving apparatuses used in the optical apparatus include one provided with a stepping motor as a driving source and a driving mechanism constituted by a lead screw rotated by the stepping motor and a rack attached to a lens holding member holding a lens and engaging with the lead screw.

For miniaturization of the optical apparatus, miniaturization of a battery thereof, which is achieved by lowering a rotation speed and an output torque of the stepping motor to reduce power consumption, is effective.

However, lowering the output torque of the stepping motor makes it easy to cause step-out of the stepping motor when a lens driving load increases. Since the driving amount of the stepping motor is generally controlled based on the number of pulses of a driving pulse signal applied to the stepping motor, the step-out collapses the relationship between the driving amount of the stepping motor and the position of the lens (lens position), which makes it impossible to control the lens position accurately. It is also possible to lower an engagement pressure (backlash reducing pressure) of the rack with respect to the lead screw in order to reduce the lens driving load. However, such lowering of the engagement pressure makes it easy to cause a situation in which the rack skips a tooth of the lead screw, that is, so-called "tooth skip" due to impact, which makes it impossible to control the lens position accurately.

Japanese Patent Laid-Open No. 05-281449 discloses a lens driving apparatus including a position sensor which detects the position of a lens that is moved by a stepping motor. In this apparatus, when the step-out of the stepping motor or the tooth skip of a driving mechanism occurs, correction of control of the stepping motor according to the lens position detected by the position sensor is performed to enable accurate lens position control.

Further, Japanese Patent Laid-Open No. 11-110045 discloses a lens driving apparatus capable of improving accuracy of lens position control, apparatus which detects the position of a lens that is moved by a stepping motor to perform feedback control of the stepping motor based on the detected lens position.

Optical apparatuses include one having a zoom optical system capable of zooming as an image taking optical system. In particular in video cameras, a so-called rear focus type zoom optical system is often used. In the rear focus type zoom optical system, variation of magnification performed by movement of a magnification-varying lens causes image plane variation (in other words, defocusing). Therefore, compensation (correction) for the image plane variation is performed by moving a focus lens that is disposed closer to an image plane than the magnification-varying lens to maintain an in-focus state. The position to which the focus lens is moved is determined in advance according to electronic cam data (hereinafter simply referred to as "cam data") showing a relationship between a position of the magnification-varying lens and a position of the focus lens at each object distance.

In order to perform the variation of magnification while maintaining the in-focus state in such a zoom optical system, it is necessary that the positions of the magnification-varying lens and focus lens accurately keep the relationship determined by the came data. The position of the magnification-varying lens can be obtained by counting the number of pulses of the driving pulse signal applied to the stepping motor that moves the magnification-varying lens from a predetermined reference position. Therefore, control of the focus lens position based on the number of pulses of the driving pulse signal (hereinafter referred to as "driving pulse number") may move the magnification-varying lens and the focus lens while keeping the relationship determined according to the cam data.

However, an engagement portion of the lead screw and the rack of the driving mechanism that transmits driving force of the stepping motor to the magnification-varying lens and a connecting portion of a lens holding member holding the magnification-varying lens and the rack respectively include a backlash. Moreover, the lead screw and the rack include a manufacturing error such as a screw pitch error. In addition, the stepping motor includes an individual variability in an actual driving amount with respect to the driving pulse number. Such a backlash, a manufacturing error and an individual variability cause mismatch between the driving pulse number applied to the stepping motor and the actual position of the magnification-varying lens, which deviates the positions of the magnification-varying lens and focus lens from the relationship determined according to the cam data. In other words, defocusing is caused with the variation of magnification.

Japanese Patent Laid-Open Nos. 05-281449 and 11-110045 only disclose that the position sensor is provided for the magnification-varying lens moved by the stepping motor to improve the position control accuracy of the magnification-varying lens.

SUMMARY OF THE INVENTION

The present invention is directed to a lens driving apparatus and a control method capable of preventing the positional relationship of the magnification-varying lens and the focus lens from deviating from the relationship determined according to the cam data due to the backlash, the manufacturing error of the driving mechanism for the magnification-varying lens or the individual variability of the stepping motor. Moreover, the present invention is directed to an optical apparatus including the above-mentioned lens driving apparatus.

The present invention provides as one aspect thereof a lens driving apparatus configured to move a magnification-varying lens and to move a focus lens in order to compensate for image plane variation caused by movement of the magnification-varying lens. The apparatus includes a zoom operating member configured to be operated by a user to move the magnification-varying lens, a stepping motor, a zoom controller configured to control drive of the stepping motor, a focus actuator configured to move the focus lens, a focus controller configured to control drive of the focus actuator, a memory configured to store cam data to compensate for the image plane variation, the cam data showing a relationship between a position of the magnification-varying lens and a position of the focus lens, and a zoom position detector configured to detect an actual position of the magnification-varying lens. During a magnification variation operation, the zoom controller performs open-loop control of the drive of the stepping motor based on an operation amount of the zoom operating member, and the focus controller controls the drive of the focus actuator based on (a) the actual position of the magnification-varying lens detected by the zoom position detector, and (b) the cam data.

The present invention provides as another aspect thereof a control method for a lens driving apparatus configured to transmit driving force of a stepping motor to a magnification-varying lens through a driving mechanism to move the magnification-varying lens in response to a user's operation of a zoom operating member, and configured to move a focus lens in order to compensate for image plane variation caused by movement of the magnification-varying lens. The method includes a detecting step of detecting an actual position of the magnification-varying lens, and a controlling step controlling drive of the focus actuator. During a magnification variation operation, the controlling step performs open-loop control of drive of the stepping motor based on an operation amount of the zoom operating member, and controls the drive of the focus actuator based on (a) the actual position of the magnification-varying lens detected in the detecting step, and (b) cam data to compensate for image plane variation, the cam data showing a relationship between a position of the magnification-varying lens and a position of the focus lens.

The present invention provides as still another aspect thereof a lens driving apparatus configured to move a magnification-varying lens and to move a focus lens in order to compensate for image plane variation caused by movement of the magnification-varying lens. The apparatus includes a stepping motor, a driving mechanism configured to transmit driving force of the stepping motor to the magnification-varying lens to move the magnification-varying lens, a zoom controller configured to control drive of the stepping motor, a focus actuator configured to move the focus lens, a focus controller configured to control drive of the focus actuator, a memory configured to store cam data to compensate for the image plane variation, the cam data showing a relationship between a position of the magnification-varying lens and a position of the focus lens, and a zoom position detector configured to detect an actual position of the magnification-varying lens. The focus controller controls, when the stepping motor is driven to move the magnification-varying lens, the drive of the focus actuator based on (a) the actual position of the magnification-varying lens detected by the zoom position detector before movement of the magnification-varying lens, (b) a target driving amount of the stepping motor, and (c) the cam data.

The present invention provides as still further another aspect thereof an optical apparatus including an optical system configured to include a magnification-varying lens and a focus lens, and a lens driving apparatus configured to move the magnification-varying lens and to move a focus lens in order to compensate for image plane variation caused by movement of the magnification-varying lens. The lens driving apparatus includes a stepping motor, a driving mechanism configured to transmit driving force of the stepping motor to the magnification-varying lens to move the magnification-varying lens, a zoom controller configured to control drive of the stepping motor, a focus actuator configured to move the focus lens, a focus controller configured to control drive of the focus actuator, a memory configured to store cam data to compensate for the image plane variation, the cam data showing a relationship between a position of the magnification-varying lens and a position of the focus lens, and a zoom position detector configured to detect an actual position of the magnification-varying lens. The focus controller controls, when the stepping motor is driven to move the magnification-varying lens, the drive of the focus actuator based on (a) the actual position of the magnification-varying lens detected by the zoom position detector before movement of the magnification-varying lens, (b) a target driving amount of the stepping motor, and (c) the cam data.

The present invention provides as yet still another aspect thereof a control method for a lens driving apparatus configured to transmit driving force of a stepping motor to a magnification-varying lens through a driving mechanism to move the magnification-varying lens, and configured to drive a focus actuator to move a focus lens in order to compensate for image plane variation caused by movement of the magnification-varying lens. The method includes a detecting step of detecting an actual position of the magnification-varying lens, and a controlling step controlling drive of the focus actuator. The controlling step controls, when the stepping motor is driven to move the magnification-varying lens, the drive of the focus actuator based on (a) the actual position of the magnification-varying lens detected in the detecting step before movement of the magnification-varying lens, (b) a target driving amount of the stepping motor, and (c) cam data to compensate for the image plane variation, the cam data showing a relationship between a position of the magnification-varying lens and a position of the focus lens.

Other aspects of the present invention will be apparent from the embodiments described below with reference to the drawings.

DESCRIPTION OF THE EMBODIMENTS

Exemplary embodiments of the present invention will be described hereinafter with reference to the accompanying drawings.

Figure 1:
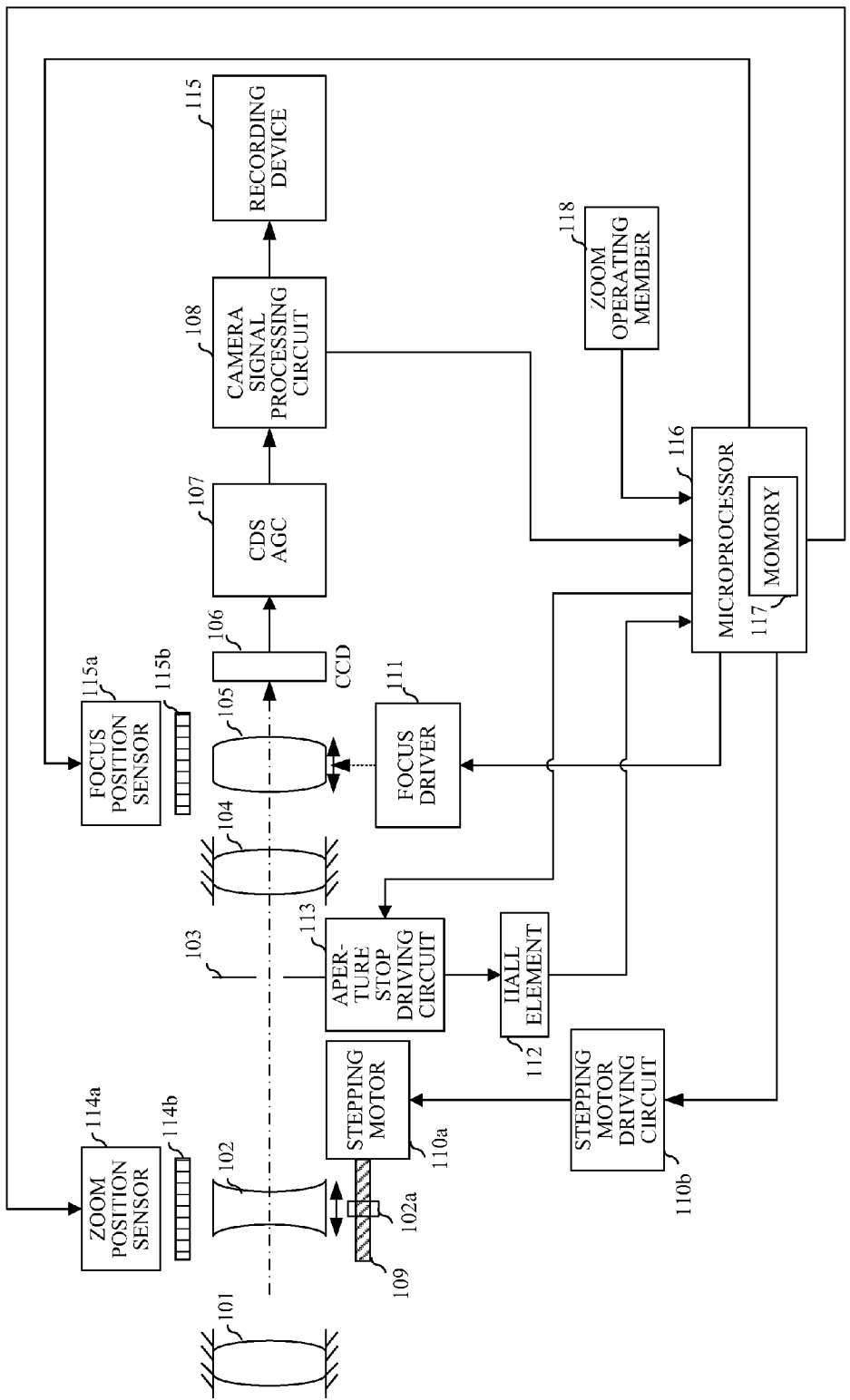
FIG. 1 shows a configuration of a video camera that is an embodiment of the present invention.

FIG. 1 shows a configuration of a video camera (optical apparatus) as an image pickup apparatus which is an embodiment of the present invention. Although description will be made of the video camera in this embodiment, alternative embodiments of the present invention includes other optical apparatuses such as a digital still camera and an interchangeable lens.

In FIG. 1, in order from an object side (left side in the figure), and reference numeral 101 denotes a first fixed lens, reference numeral 102 denotes a magnification-varying lens (hereinafter referred to as "zoom lens") that moves in an optical axis direction to perform variation of magnification. Reference numeral 103 denotes an aperture stop unit. Reference numeral 104 denotes a second fixed lens, and reference numeral 105 denotes a focus compensator lens (hereinafter referred to as "focus lens") that has a function of compensating (correcting) for image plane variation caused by the variation of magnification (that is, movement of the magnification-varying lens) and a focusing function. The first fixed lens 101, the zoom lens 102, the aperture stop 103, the second fixed lens 104 and the focus lens 105 constitute an image taking optical system.

Although the zoom lens 102 and the focus lens 105 are actually held by lens holding members, respectively, and the lens holding members are guided to the optical axis direction by guide bars extending in the optical axis direction, FIG. 1 omits the lens holding members and the guide bars.

Reference numeral 110a denotes a stepping motor that is a driving source of the zoom lens 102. Reference numeral 110b denotes a stepping motor driving circuit that drives the stepping motor 110a in response to a control signal from a microprocessor 116 as a zoom controller.

An output shaft of the stepping motor 110a is formed as a lead screw 109. A rack 102a attached to the zoom lens 102 (actually, to the lens holding member holding the zoom lens 102) engages with the lead screw 109. The lead screw 109 and the rack 102a constitute a driving mechanism.

Driving the stepping motor 110a to rotate the lead screw 109 transmits driving force of the stepping motor 110a to the zoom lens 102 by the engagement of the lead screw 109 and the rack 102a. As a result, the zoom lens 102 is moved in the optical axis direction (direction shown by an arrow in the figure).

In this embodiment, the stepping motor 110a is controlled by open-loop control method. Specifically, the microprocessor 116 drives the stepping motor 110a through a stepping motor driving circuit 110b so as to move the zoom lens 102 to a predetermined reference position at the time of power-on of the video camera and the like. This operation is called a zoom reset operation. A reference position sensor (not shown) can detect that the zoom lens 102 reaches the reference position.

The reference position sensor is constituted by a photo interrupter or the like. A light-shielding portion formed on the zoom lens 102 (actually, on the lens holding member holding the zoom lens 102) enters into a space between a light-projecting part and a light-receiving part of the photo interrupter, and the photo interrupter is changed from a light-receiving state to a light-shielded state. As a result, detection is made that the zoom lens 102 reaches the reference position.

After the zoom reset operation, the microprocessor 116 drives the stepping motor 110a to move the zoom lens 102 to an image pickup start position (movable end, a wide-angle end in this embodiment, but the image pickup start position may be a telephoto end). The zoom lens 102 located at the image pickup start position allows image taking by the video camera. The number of pulses of a driving pulse signal to be applied to the stepping motor 110a for causing the zoom lens 102 to be moved from the reference position to the wide-angle end is stored in advance in a memory 117 provided in the microprocessor 116.

In addition, when a user operates a zoom operating member 118 to move the zoom lens 102 from the wide-angle end to an arbitrary position, the microprocessor 116 calculates the number of pulses of the driving pulse signal (hereinafter referred to as "driving pulse number") to be applied to the stepping motor 110a. This calculation result is hereinafter referred to as "target driving pulse number (target driving amount)". Then, the microprocessor 116 applies the driving pulse signal to the stepping motor 110a through the stepping motor driving circuit 110b until an actual driving pulse number (actual driving amount) reaches the target driving pulse number.

Thus, employing the open-loop control method for the zoom lens 102 enables driving control of the zoom lens (that is, magnification variation operation) with a simpler configuration as compared with a case of using feedback control method.

Position information of the zoom lens 102 from the reference position can be obtained by using a count value of the driving pulse number of the stepping motor 110a. However, the lead screw 109 and the rack 102a constituting the driving mechanism of the zoom lens 102 have a backlash therebetween. Further, the lead screw 109 and the rack 102a have manufacturing errors, and the stepping motor 110a has an individual variability in the driving amount thereof with respect to the driving pulse number. Such a backlash, a manufacturing error and an individual variability cause mismatch between the position of the zoom lens 102 obtained from the count value of the driving pulse number and an actual position of the zoom lens 102.

In this embodiment, a zoom position sensor (zoom position detector) 114a is provided to detect the actual position of the zoom lens 102. A position scale 114b is attached to the zoom lens 102 (actually, to the lens holding member holding the zoom lens 102), and the zoom position sensor 114a is fixed at a position facing the position scale 114b.

The position scale 114b includes a scale pattern formed thereon such as a magnetic pattern and an optical reflective pattern, the scale pattern changing in the optical axis direction. The zoom position sensor 114a reads a magnetic signal or an optical signal which is changed by the scale pattern to detect the actual position of the zoom lens 102 in the optical axis direction. A detection signal from the zoom position sensor 114a is input to the microprocessor 116 to be used for controlling the drive of the focus lens 105 during the variation of magnification.

Reference numeral 111 denotes a focus driver including a focus motor (focus actuator) that is a driving source of the focus lens 105. The focus driver 111 drives the focus motor according to a control signal from the microprocessor 116 as a focus controller.

Reference numeral 115a denotes a focus position sensor which detects an actual position of the focus lens 105. A position scale 115b is attached to the focus lens 105 (actually, to a lens holding member holding the focus lens 105), and the focus position sensor 115a is fixed at a position facing the position scale 115b.

The position scale 115b includes a scale pattern formed thereon such as a magnetic pattern and an optical reflective pattern, the scale pattern changing in the optical axis direction. The focus position sensor 115a reads a magnetic signal or an optical signal which is changed by the scale pattern to detect the actual position of the focus lens 105 in the optical axis direction. A detection signal from the focus position sensor 115a is input to the microprocessor 116 to be used for feedback control of the position of the focus lens 105 to compensate for the image plane variation caused by the variation of magnification and to perform focusing.

In this embodiment, a voice coil motor (VCM) or a DC motor is used as the focus motor. However, a stepping motor may be used as the focus motor and may omit the focus position sensor 115a and the position scale 115b.

The microprocessor 116 controls, in addition to the drive of the stepping motor 110a and the focus motor in response to the operation of the zoom operating member 118 as described above, operations of the entire video camera in response to input from various switches. Moreover, the microprocessor 116 includes a counter that counts the above-described driving pulse number applied to the stepping motor 110a.

In the memory 117, electronic cam data (hereinafter simply referred to as "cam data") is stored for each of predetermined object distances. The cam data is data used for compensating for the image plane variation caused by the variation of the magnification and data showing a relationship between the position of the zoom lens 102 and the position of the focus lens 105. The cam data is also called as zoom tracking data, and is data showing the position (track) at which the focus lens 105 should be located to maintain an in-focus state when the zoom lens 102 is moved for the variation of magnification.

When the zoom lens 102 is moved, the microprocessor 116 controls the drive of the focus motor based on the detection result of the actual position of the zoom lens 102 before its movement detected by the zoom position sensor 114a, the target driving amount of the stepping motor 110a and the cam data.

The aperture stop unit 103 moves plural stop blades in open and close directions by a stop actuator (galvano motor) (not shown) to change an aperture diameter so as to adjust an amount of light. Reference numeral 113 denotes an aperture stop driving circuit that drives the stop actuator according to a control signal from the microprocessor 116. Reference numeral 112 denotes an aperture stop position detection element such as a hall element which detects open and close states of the stop blades (that is, an aperture value). A detection signal from the aperture stop position detection element 112 is input to the microprocessor 116 to be used for controlling the aperture value.

The stepping motor 110a, the stepping motor driving circuit 110b, the position sensors 114a and 115a (scales 114b and 115b), the focus driver 111 and the microprocessor 116 constitute a lens driving apparatus.

Reference numeral 106 denotes an image pickup element as a photoelectric conversion element constituted by a CCD sensor or a CMOS sensor. Reference numeral 107 denotes a CDS/AGC circuit that samples outputs from the image pickup element 106 and adjusts a gain. Reference numeral 108 denotes a camera signal processing circuit that performs various signal processing on an output signal from the CDS/AGC circuit 107 to generate a video signal.

The video signal is forwarded to a recording device 115. The recording device 115 converts the video signal into a signal of a predetermined recording format, and records the converted video signal in a recording medium such as a magnetic tape, a semiconductor memory and an optical disc.

Moreover, the video signal is input to the microprocessor 116. The microprocessor 116 extracts a luminance component of the input video signal, and controls the aperture stop unit 103 through the aperture stop driving circuit 113 such that the extracted luminance component always has a proper value. The detection signal from the aperture stop position detection element 112 is input to the microprocessor 116. The microprocessor 116 performs feedback control of the aperture value of the aperture stop unit 103 based on the detection signal.

Figure 2:
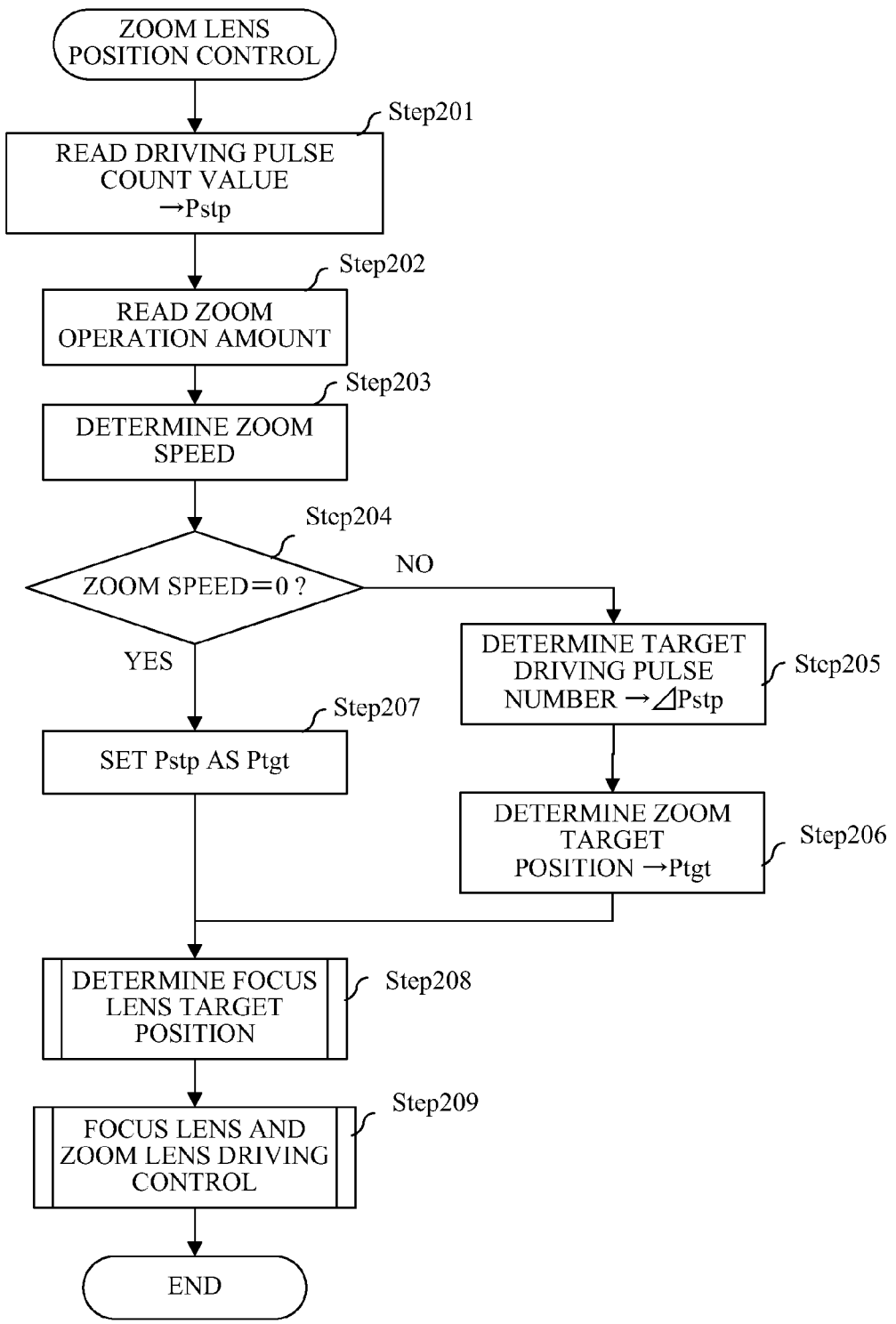
FIG. 2 is a flowchart showing zooming control in the video camera of the embodiment.

Next, description will be made of zooming control (control method) in the video camera thus configured, with reference to a flowchart shown in FIG. 2. The zooming control is performed according to a computer program stored in the microprocessor 116. The description is started from a state in which the zoom lens 102 is located at any position between the wide-angle end which is the image pickup start position and the telephoto end after the zoom reset operation has been performed.

At STEP 201, the microprocessor 116 reads a count value (hereinafter referred to as "driving pulse count value") Pstp of the current driving pulse number of the stepping motor 110a from an internal counter. Then, the microprocessor 116 stores the driving pulse count value Pstp in a RAM (not shown) provided in the microprocessor 116. The driving pulse count value Pstp herein corresponds to the current position of the zoom lens 102 converted from the driving pulse number.

Next, at STEP 202, the microprocessor 116 reads an operation amount (hereinafter referred to as "zoom operation amount") of the zoom operating member 118 operated by the user. Then, at STEP 203, the microprocessor 116 determines a zoom speed that is a driving speed of the stepping motor 110a based on the zoom operation amount.

Next, at STEP 204, the microprocessor 116 determines whether or not the zoom speed determined at STEP 203 is 0. When the zoom speed is not 0, the microprocessor 116 regards a current state as a state where zooming is being performed to proceed to STEP 205. When the zoom speed is 0, the microprocessor 116 regards the current state as a state where zooming is not performed to proceed to STEP 207.

At STEP 205, the microprocessor 116 calculates a target driving pulse number ΔPstp that is a target driving amount of the stepping motor 110a. The video camera of this embodiment executes a computer program for this zooming control at each cycle of a vertical synchronizing signal of a video signal (for example, the cycle is 1/50 seconds in PAL, and 1/60 seconds in NTSC). Therefore, the target driving pulse number ΔPstp is defined as a driving amount by which the stepping motor 110a is driven at the zoom speed determined at STEP 203 within one cycle of the vertical synchronizing signal. Then, the microprocessor 116 proceeds to STEP 206.

At STEP 206, the microprocessor 116 adds or subtracts the driving pulse count value Pstp stored in the RAM at STEP 201 and the target driving pulse number ΔPstp calculated at STEP 205, according to a zooming direction (telephoto direction or wide-angle direction). As a result, the microprocessor 116 calculates a target driving position (hereinafter referred to as "zoom target position") Ptgt of the stepping motor 110a, in other words, of the zoom lens 102. Then, the microprocessor 116 stores the zoom target position Ptgt in the RAM, and proceeds to STEP 208.

On the other hand, at STEP 207, since zooming is not performed, the microprocessor 116 sets a current value of the driving pulse count value Pstp of the stepping motor 110a as the zoom target position Ptgt, and proceeds to STEP 208.

At STEP 208, the microprocessor 116 performs processing to determine a target position of the focus lens 105, which will be described later.

Then, at STEP 209, the microprocessor 116 drives the stepping motor 110a toward the zoom target position Ptgt calculated at STEP 206. Further, the microprocessor 116 drives the focus motor so as to move the focus lens 105 to the target position determined at STEP 208. When the microprocessor 116 determines that Pstp is equal to Ptgt at STEP 207, the microprocessor 116 does not drive the focus motor.

Next, description will be made of the processing to determine the target position of the focus lens 105 performed at STEP 208 with reference to a flowchart of FIG. 3.

At STEP 301, the microprocessor 116 detects a current actual position Pfsens of the focus lens 105 through the focus position sensor 115a, and stores it in the RAM. When a stepping motor is used as the focus motor, a driving pulse count value of the stepping motor is used as current position data of the focus lens 105.

Next, at STEP 302, the microprocessor 116 detects a current actual position Psens of the zoom lens 102 through the zoom position sensor 114a, and stores it in the RAM.

Next, at STEP 303, the microprocessor 116 calculates an object distance based on the detected current positions of the zoom lens 102 and focus lens 105 and a distance detected by a ranging device (not shown). Then, the microprocessor 116 reads, from the cam data for the respective object distances stored in the memory 117, cam data corresponding to the calculated object distance as tracking cam data. Controlling the position of the focus lens 105 according to the tracking cam data when the zoom lens 102 is moved from the current position makes it possible to maintain an in-focus state.

The driving pulse count value Pstp of the stepping motor 110a obtained at STEP 201 is a value affected by the above-mentioned backlash or manufacturing error of the driving mechanism and the individual variability of the stepping motor 110a. Therefore, the driving pulse count value Pstp does not necessarily correspond to the actual position Psens of the zoom lens 102 detected by the zoom position sensor 114a. Accordingly, controlling the position of the focus lens 105 based on the driving pulse count value Pstp of the stepping motor 110a may make it impossible to maintain an in-focus state.

Thus, at STEP 304, the microprocessor 116 adds the target driving pulse number ΔPstp of the stepping motor 110a determined at STEP 205 to the current actual position Psens of the zoom lens 102 (in other words, the position of the zoom lens 102 before its movement) by using the following expression (1). As a result, the microprocessor 116 calculates (determines) a focus tracking zoom target position Pstgt, and stores it in the RAM. The focus tracking zoom target position Pstgt corresponds to a position of the zoom lens 102 after movement thereof from the current actual position Psens when the stepping motor 110a is driven by the target driving pulse number ΔPstp of.

$$Pstgt = Psens + \Delta Pstp \quad (1)$$

Next, at STEP 305, the microprocessor 116 determines whether or not the driving direction of the stepping motor 110a has been reversed in this zooming. If the driving direction of the stepping motor 110a has been reversed, the microprocessor 116 proceeds to STEP 306. If the driving direction of the stepping motor 110a has not been reversed, the microprocessor 116 proceeds to STEP 307.

At STEP 306, the microprocessor 116 calculates again (redetermines) the focus tracking zoom target position Pstgt by using the following expression (2) while taking into consideration of a reversal hysteresis Phys of the stepping motor 110a.

$$Pstgt = Psens + \Delta Pstp - Phys \quad (2)$$

The reversal hysteresis Phys is a value corresponding to an amount of deviation of the actual driving amount with respect to the driving pulse number, deviation which is caused by the reversal of the driving direction of the stepping motor 110a. The reversal hysteresis Phys is a peculiar value to an individual of the stepping motor. The reversal hysteresis Phys is measured beforehand and stored in the memory 117.

The microprocessor 116 proceeds to STEP 307 after the processing at STEP 306.

At STEP 307, the microprocessor 116 determines whether or not the drive of the stepping motor 110a is stopped. If the drive thereof is not stopped, the microprocessor 116 proceeds to STEP 308. If the drive thereof is stopped, the microprocessor 116 proceeds to STEP 309.

At STEP 308, the microprocessor 116 calculates a position of the focus lens 105 corresponding to the focus tracking zoom target position Pstgt obtained at STEP 304 or STEP 306 from the tracking cam data to set the calculated position as a target position of the focus lens 105 (hereinafter referred to as "focus target position"). Then, the microprocessor 116 proceeds to STEP 209 in FIG. 2.

On the other hand, when the drive of the stepping motor 110a is stopped at STEP 307, the zoom lens 102 is also stopped. However, the actual position Psens of the zoom lens 102 does not necessarily coincide with the zoom target position Ptgt of the stepping motor 110a as described above, and the zoom lens 102 is stopped at a position including an error below a certain threshold with respect to the position corresponding to the zoom target position Ptgt.

In contrast thereto, the processing so far calculates the target position of the focus lens 105 as a position on the tracking cam data corresponding to the zoom target position Ptgt of the stepping motor 110a. Therefore, deviation of the actual position of the zoom lens 102 from the position corresponding to the zoom target position Ptgt of the stepping motor 110a generates defocusing. In particular, setting of a manual focus mode in the video camera maintains a defocused state since auto focus is not performed.

To prevent such a defocused state from being maintained, at STEP 309, the microprocessor 116 calculates a position of the focus lens 105 corresponding to the actual position Psens of the zoom lens 102 detected by the zoom position sensor 114a from the tracking cam data. Then, the microprocessor 116 sets the calculated position of the focus lens 105 as the target position of the focus lens 105. After that, the microprocessor 116 proceeds to STEP 209 in FIG. 2.

Figure 4:
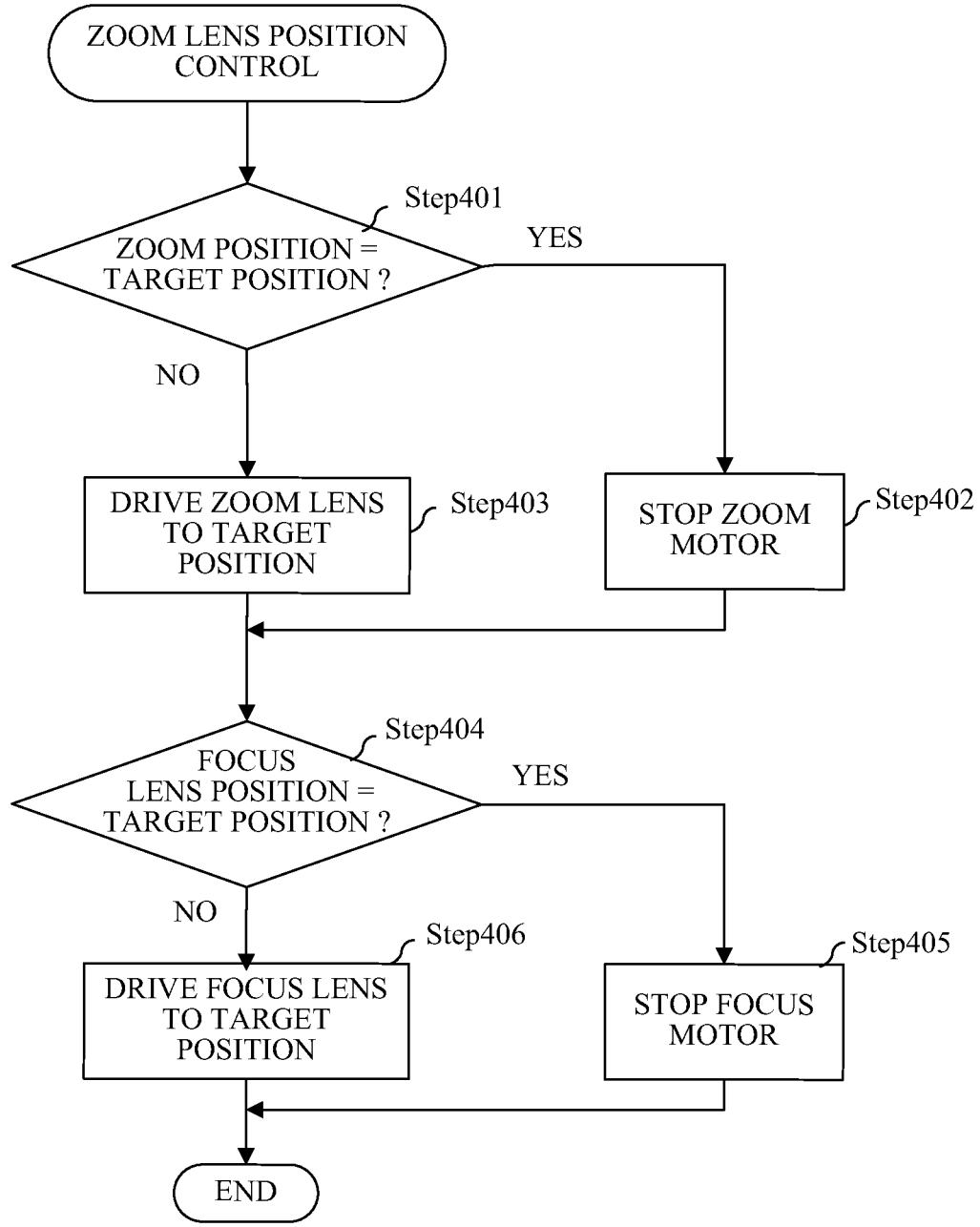
FIG. 4 is a flowchart showing zoom lens and focus lens position control in the zooming control.

Next, description will be made of the driving control of the zoom lens 102 and the focus lens 105 (that is, the driving control of the stepping motor 110a and the focus motor) performed at STEP 209 in FIG. 2 with reference to a flowchart shown in FIG. 4.

At STEP 401, the microprocessor 116 determines whether or not the position of the zoom lens 102 coincides with the focus tracking zoom target position Pstgt. If the position of the zoom lens 102 does not coincide with the focus tracking zoom target position Pstgt, the microprocessor 116 proceeds to STEP 403 to drive the stepping motor 110a so as to move the zoom lens 102 to the focus tracking zoom target position Pstgt. Then, the microprocessor 116 proceeds to STEP 404. On the other hand, if the position of the zoom lens 102 coincides with the focus tracking zoom target position Pstgt, the microprocessor 116 proceeds to STEP 402 to stop the drive of the stepping motor 110a. Then, the microprocessor 116 proceeds to STEP 404.

Figure 3:
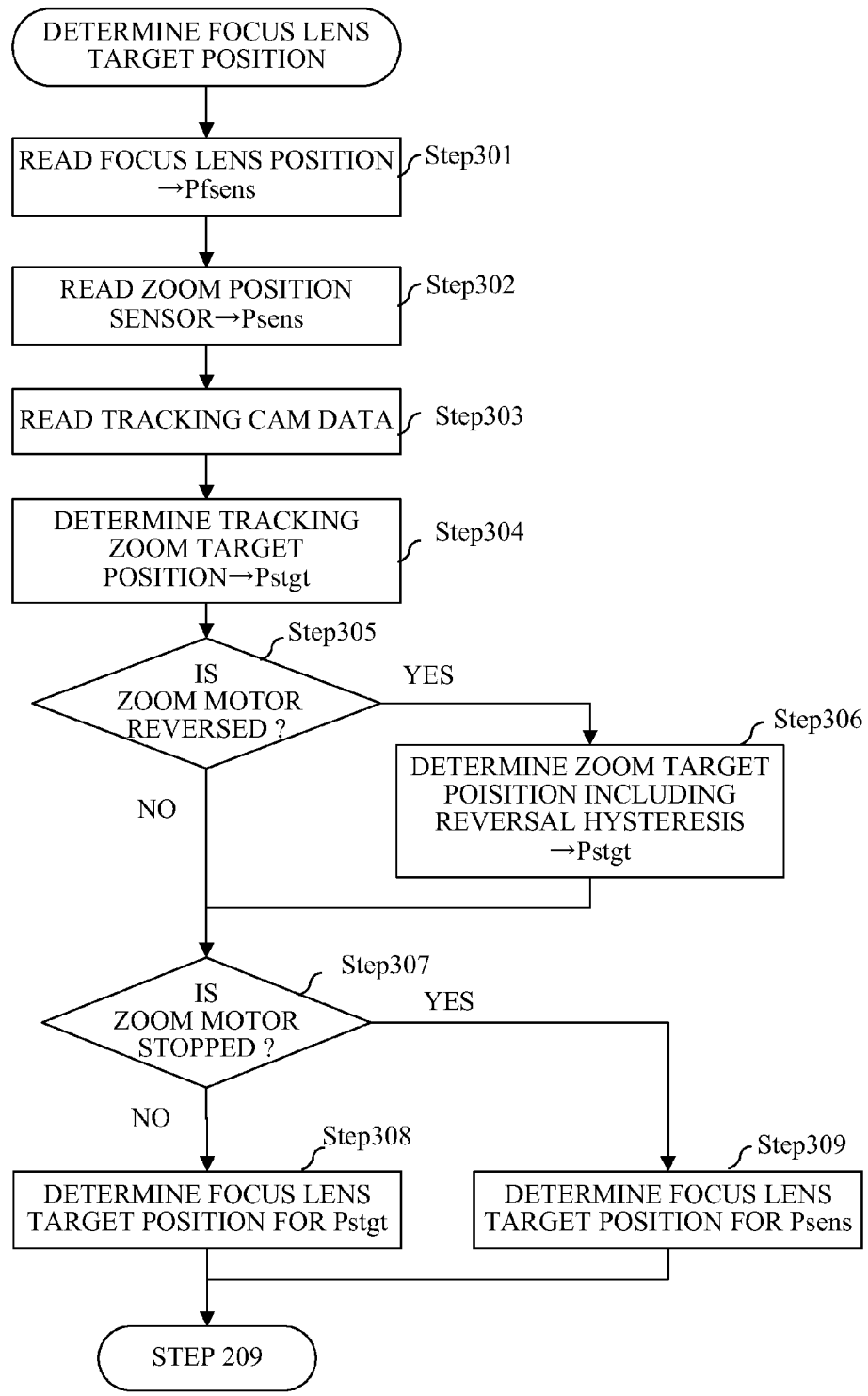
FIG. 3 is a flowchart showing target focus lens position determining processing in the zooming control.

At STEP 404, the microprocessor 116 determines whether or not the position of the focus lens 105 (detected position by the focus position sensor 115a) coincides with the target position determined by the processing shown in FIG. 3. If the position of the focus lens 105 does not coincide with the target position, the microprocessor 116 proceeds to STEP 406 to drive the focus motor so as to move the focus lens 105 to the target position, and then ends the processing. On the other hand, if the position of the focus lens 105 coincides with the target position, the microprocessor 116 proceeds to STEP 405 to stop the drive of the focus motor, and then ends the processing.

As described above, this embodiment performs the open-loop control of the stepping motor 110a. In the open-loop control, the situation in which the actual position of the zoom lens 102 does not correspond to (is mismatched with) the driving pulse number of the stepping motor 110a is caused due to the backlash and manufacturing error in the driving mechanism or the individual variability of the stepping motor 110a. However, this embodiment determines the position of the focus lens 105 on the tracking cam data based on the detection result of the actual position of the zoom lens 102 detected by zoom position sensor 114a. This can keep the positional relationship between the zoom lens 102 and the focus lens 105 to the positional relationship determined according to the tracking cam data, which makes it possible to maintain an in-focus state during zooming.

When the zoom lens 102 is located at the telephoto end or the wide-angle end, even though the stepping motor 110a is not driven, the position of the zoom lens 102 may be changed due to the backlash in the drive mechanism. In this case, the microprocessor 116 regards the zoom lens 102 as being stopped at the telephoto end or the wide-angle end even though the detection result of the zoom position sensor 114a changes. This can prevent generation of erroneous operations in which a zoom position display is changed or an electronic zoom operation is canceled even though the user does not perform a zoom operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, the above embodiment described the case where the drive mechanism for the zoom lens includes the lead screw and the rack. However, the drive mechanism may include gears or the like other than the lead screw and the rack.

This application claims the benefit of Japanese Patent Application No. 2008-332272, filed on Dec. 26, 2008, which is hereby incorporated by reference herein in its entirety.

What is claimed is:

1. A lens driving apparatus configured to move a magnification-varying lens, to move a focus lens in order to compensate for image plane variation caused by movement of the magnification-varying lens, and to perform a zoom position display, the apparatus comprising:
   a zoom operating member configured to be operated by a user to move the magnification-varying lens;
   a motor configured to move the magnification-varying lens based on an operation amount of the zoom operating member;
   a zoom controller configured to perform an open-loop control of a drive of the motor;
   a focus actuator configured to move the focus lens;
   a focus controller configured to control drive of the focus actuator;
   a memory configured to store cam data to compensate for the image plane variation, the cam data showing a relationship between a position of the magnification-varying lens and a position of the focus lens; and
   a zoom position detector configured to detect an actual position of the magnification-varying lens, the zoom position detector capable of detecting the actual position of the magnification-varying lens by detecting a scale arranged in a moving direction of the magnification-varying lens,
   wherein, during a magnification variation operation by the zoom controller, the focus controller controls the drive of the focus actuator based on (a) the actual position of the magnification-varying lens detected by the zoom position detector and (b) the cam data, and
   wherein the zoom position display is not changed when changing of the actual position of the magnification-varying lens is detected by the zoom position detector when the motor is not driven.

2. A lens driving apparatus according to claim 1, further comprising:
   a pulse memory configured to store a driving pulse number to be applied to the motor for moving the magnification-varying lens from its reference position to its movable end.

3. A control method for a lens driving apparatus configured to transmit driving force of a motor to a magnification-varying lens through a driving mechanism to move the magnification-varying lens by an open-loop control of a drive of the motor in response to a user's operation of a zoom operating member, configured to move a focus lens in order to compensate for image plane variation caused by movement of the magnification-varying lens, and configured to perform a zoom position display, the method comprising:
   a detecting step of detecting an actual position of the magnification-varying lens by detecting a scale arranged in a moving direction of the magnification-varying lens; and
   a controlling step controlling drive of the focus actuator,
   wherein, during a magnification variation operation by the user's operation of the zoom operating member, the controlling step controls the drive of the focus actuator based on (a) the actual position of the magnification-varying lens detected in the detecting step, and (b) cam data to compensate for image plane variation, the cam data showing a relationship between a position of the magnification-varying lens and a position of the focus lens, and
   wherein, in the controlling step, the zoom position display is not changed when changing of the actual position of the magnification-varying lens is detected by the zoom position detector when the motor is not driven.

4. A lens driving apparatus configured to move a magnification-varying lens, to move a focus lens in order to compensate for image plane variation caused by movement of the magnification-varying lens, and to perform a zoom position display, the apparatus comprising:
   a motor configured to move the magnification-varying lens based on an operation amount of the zoom operating member;
   a driving mechanism configured to transmit driving force of the motor to the magnification-varying lens to move the magnification-varying lens;
   a zoom controller configured to perform an open-loop control of a drive of the motor;
   a focus actuator configured to move the focus lens;
   a focus controller configured to control drive of the focus actuator;
   a memory configured to store cam data to compensate for the image plane variation, the cam data showing a relationship between a position of the magnification-varying lens and a position of the focus lens; and
   a zoom position detector configured to detect an actual position of the magnification-varying lens, the zoom position detector capable of detecting the actual position of the magnification-varying lens by detecting a scale arranged in a moving direction of the magnification-varying lens,
   wherein the focus controller controls, when the motor is driven with the open-loop control to move the magnification-varying lens, the drive of the focus actuator based on (a) the actual position of the magnification-varying lens detected by the zoom position detector before movement of the magnification-varying lens, (b) a target driving amount of the motor, and (c) the cam data, and
   wherein the zoom position display is not changed when changing of the actual position of the magnification-varying lens is detected by the zoom position detector when the motor is not driven.

5. A lens driving apparatus according to claim 4,
   wherein, when a driving direction of the motor is reversed, the focus controller controls the drive of the focus actuator based on (a) the actual position of the magnification-varying lens detected by the zoom position detector before the movement of the magnification-varying lens, (b) the target driving amount of the motor, (c) a deviation amount of a driving amount of the motor, the deviation amount being caused by the reversal of the driving direction of the motor, and (d) the cam data.

6. An optical apparatus comprising:

an optical system configured to include a magnification-varying lens and a focus lens; and a lens driving apparatus configured to move the magnification-varying lens, to move a focus lens in order to compensate for image plane variation caused by movement of the magnification-varying lens, and to perform a zoom position display, wherein the lens driving apparatus comprising:

a motor configured to move the magnification-varying lens based on an operation amount of the zoom operating member;

a driving mechanism configured to transmit driving force of the motor to the magnification-varying lens to move the magnification-varying lens;

a zoom controller configured to perform an open-loop control of a drive of the motor;

a focus actuator configured to move the focus lens;

a focus controller configured to control drive of the focus actuator;

a memory configured to store cam data to compensate for the image plane variation, the cam data showing a relationship between a position of the magnification-varying lens and a position of the focus lens; and a zoom position detector configured to detect an actual position of the magnification-varying lens, the zoom position detector capable of detecting the actual position of the magnification-varying lens by detecting a scale arranged in a moving direction of the magnification-varying lens, wherein the focus controller controls, when the motor is driven with the open-control to move the magnification-varying lens, the drive of the focus actuator based on (a) the actual position of the magnification-varying lens detected by the zoom position detector before movement of the magnification-varying lens, (b) a target driving amount of the motor, and (c) the cam data, and wherein the zoom position display is not changed when changing of the actual position of the magnification-varying lens is detected by the zoom position detector when the motor is not driven.

7. A control method for a lens driving apparatus configured to transmit driving force of a motor to a magnification-varying lens through a driving mechanism to move the magnification-varying lens by an open-loop control of a drive of the motor, configured to drive a focus actuator to move a focus lens in order to compensate for image plane variation caused by movement of the magnification-varying lens, and configured to perform a zoom position display, the method comprising:

a detecting step of detecting an actual position of the magnification-varying lens by detecting a scale arranged in a moving direction of the magnification-varying lens; and a controlling step controlling drive of the focus actuator, wherein the controlling step controls, when the motor is driven with the open-loop control to move the magnification-varying lens, the drive of the focus actuator based on (a) the actual position of the magnification-varying lens detected in the detecting step before movement of the magnification-varying lens, (b) a target driving amount of the motor, and (c) cam data to compensate for the image plane variation, the cam data showing a relationship between a position of the magnification-varying lens and a position of the focus lens, and wherein, in the controlling step, the zoom position display is not changed when changing of the actual position of the magnification-varying lens is detected by the zoom position detector when the motor is not driven.

* * * * *